(12) United States Patent
Razzell et al.

(10) Patent No.: US 8,915,136 B2
(45) Date of Patent: Dec. 23, 2014

(54) DETERMINATION OF PIPE INTERNAL CROSS-SECTIONAL AREA

(75) Inventors: Anthony G. Razzell, Derby (GB); Robert J. Mitchell, Derby (GB)

(73) Assignee: Rolls-Royce PLC, London (GB)

( * ) Notice: Subject to any disclaimer, the term of this patent is extended or adjusted under 35 U.S.C. 154(b) by 240 days.

(21) Appl. No.: 13/439,230

(22) Filed: Apr. 4, 2012

(65) Prior Publication Data

US 2012/0260741 A1 Oct. 18, 2012

(30) Foreign Application Priority Data

Apr. 15, 2011 (GB) .................................. 1106404.5

(51) Int. Cl.
*G01B 13/10* (2006.01)
*G01B 21/28* (2006.01)

(52) U.S. Cl.
CPC ...................................... *G01B 21/28* (2013.01)
USPC ...................................................... 73/432.1

(58) Field of Classification Search
CPC ................................................... G01B 13/10
USPC ...................................................... 73/432.1
See application file for complete search history.

(56) References Cited

U.S. PATENT DOCUMENTS

| | | | |
|---|---|---|---|
| 4,084,436 A | 4/1978 | Smitherman | |
| 4,142,414 A | 3/1979 | Cosentino | |
| 4,725,883 A * | 2/1988 | Clark et al. | 348/84 |
| 4,887,231 A | 12/1989 | Ratliff et al. | |
| 5,092,176 A | 3/1992 | Buttram et al. | |
| 5,408,874 A | 4/1995 | Fleck, Sr. et al. | |
| 5,604,531 A | 2/1997 | Iddan et al. | |
| 6,020,918 A | 2/2000 | Murphy | |
| 7,278,311 B1 | 10/2007 | Demin | |
| 2009/0217753 A1 * | 9/2009 | Burris | 73/290 V |

FOREIGN PATENT DOCUMENTS

| | | |
|---|---|---|
| GB | 1 524 042 | 9/1978 |
| JP | A-58-6278 | 1/1983 |
| JP | A-10-332459 | 12/1998 |
| JP | A-2005-37212 | 2/2005 |
| JP | A-2009-69136 | 4/2009 |
| JP | A-2009-198377 | 9/2009 |
| RU | 2 209 343 C2 | 7/2003 |
| SU | 1226056 A | 4/1986 |
| SU | 1768969 A1 | 10/1992 |

OTHER PUBLICATIONS

Search Report issued in British Patent Application No. GB 1106404.5 dated May 27, 2011.

(Continued)

*Primary Examiner* — Hezron E Williams
*Assistant Examiner* — Mark A Shabman
(74) *Attorney, Agent, or Firm* — Oliff PLC

(57) ABSTRACT

A method is provided of determining the internal cross-sectional area of a pipe along its length. The method includes the steps of:
  (a) filling the pipe with a first fluid;
  (b) feeding a second fluid into the pipe at a known flow rate, a meniscus being formed between the first and the second fluid, and the meniscus moving along the pipe as the second fluid displaces the first fluid in the pipe;
  (c) ultrasonically detecting the position of the meniscus as it moves along the pipe; and
  (d) determining from the second fluid flow rate and the meniscus position, the internal cross-sectional area of the pipe along its length.

9 Claims, 2 Drawing Sheets

(56) References Cited

OTHER PUBLICATIONS

Search Report issued in British Patent Application No. GB 1106405.2 dated Jul. 15, 2011.
Kato, Shigeo et al., "Development of Inchworm Type Mobile Robot Movable in Pipes with T-Junction," Proc. of American Society for Precision Engineering, 2004 Annual Meeting, pp. 257-260.
U.S. Appl. No. 13/439,438, filed Apr. 4, 2012 in the name of Razzell et al.
Jul. 26, 2012 Search Report issued in European Patent Application No. EP 12 16 3115.
Jun. 22, 2012 Search Report issued in European Patent Application No. EP 12 16 3117.
Office Action issued in U.S. Appl. No. 13/439,438 dated Apr. 25, 2014.
Aug. 7, 2014 Office Action issued in U.S. Appl. No. 13/439,438.

\* cited by examiner

DETERMINATION OF PIPE INTERNAL CROSS-SECTIONAL AREA

The present invention relates to a method and system for determining the internal cross-sectional area of a pipe.

Corrosion and the build up of deposits in the tubes of boilers and steam generators found in most power plants can affect the lifetime and performance of such components. It is thus desirable to be able to measure the extent of such corrosion and deposition, e.g. in order to implement an appropriate maintenance regime.

U.S. Pat. No. 5,092,176 proposes a method of determining the amount of low density deposits on the inner surface of boiler tubes by reflecting ultrasonic energy back and forth between the inner and outer surfaces of a tube, each reflection losing energy into the low density deposit.

However, the approach of U.S. Pat. No. 5,092,176 requires access to the outer surface of the pipe at the deposit measurement position. It would be desirable to provide an approach that does not require such access.

Accordingly, in a first aspect, the present invention provides a method of determining the internal cross-sectional area of a pipe along its length, the method including the steps of:
(a) filling the pipe with a first fluid;
(b) feeding a second fluid into the pipe at a known flow rate, a meniscus being formed between the first and the second fluid, and the meniscus moving along the pipe as the second fluid displaces the first fluid in the pipe;
(c) ultrasonically detecting the position of the meniscus as it moves along the pipe; and
(d) determining from the second fluid flow rate and the meniscus position, the internal cross-sectional area of the pipe along its length.

Advantageously, the method can provide a determination of the internal cross-sectional area of the pipe along its length without requiring access to positions along the pipe for the determination. From the internal cross-sectional area it is then possible to make inferences about the condition of the pipe, e.g. whether it is suffering from deposit build up and/or corrosion.

The method may have any one or, to the extent that they are compatible, any combination of the following optional features.

The second fluid can be immiscible with the first fluid and the meniscus can thus be formed at an interface between the first and the second fluid. For example, the first and second fluid can be benzene and water.

Alternatively, however, the method may further include between steps (a) and (b) the step of feeding a known volume of a third fluid into the pipe, the third fluid being immiscible with the first and second fluids such that respective menisci are formed at interfaces between the first and third fluids and between the second and third fluids. In step (c), the positions of both menisci can then be detected as they move along the pipe, and, in step (d), the internal cross-sectional area of the pipe along its length can be determined from the second fluid flow rate and the positions of the menisci. The first, second and third fluids can be different fluids, for example water, benzyl alcohol and decane. However, another option is for the first and second fluids to be the same, and only the third fluid to be different. For example, the first and second fluids can be water, and the third fluid can be benzene, or the first and second fluids can be benzene, and the third fluid can be water. This option is generally possible when the diameter of the pipe is such that surface tension effects overcome buoyancy.

Preferably, the fluids have similar densities. This can help to prevent buoyancy forces breaking the or each meniscus.

In step (d), the volume V of the second fluid fed into the pipe can be determined from the second fluid flow rate. Conveniently, the internal cross-sectional area A of the pipe at a given meniscus position x can then be determined from the expression:

$$A(x)=dV(x)/dx.$$

However, when a third fluid is fed into the pipe, in step (d), the length of the third fluid in the pipe may be determined from the positions of the menisci, the average internal cross-sectional area of the pipe in a region occupied by the third fluid being determined from the known volume of the third fluid and its length.

Conveniently, in step (c), the position of the meniscus may be detected by reflecting ultrasound off the meniscus, the ultrasound travelling to and from the meniscus along the fluid in the pipe. To measure the position of the meniscus, corrections for the differing velocities of sound in the fluids will generally be necessary.

The pipe may be a boiler or steam generator pipe, or a fuel line.

Typically, the pipe has a 10 mm or less internal diameter. This helps to prevent buoyancy forces breaking the or each meniscus.

In a second aspect, the present invention provides a system for determining the internal cross-sectional area of a pipe along its length, the system including:
a pump for feeding a second fluid into the pipe, which is previously filled with a first fluid;
a flow controller for determining the flow rate of the second fluid into the pipe, a meniscus being formed between the first and the second fluid, the meniscus moving along the pipe as the second fluid displaces the first fluid in the pipe;
an ultrasonic detector for ultrasonically detecting the position of the meniscus as it moves along the pipe; and
a processor device, such as a computer, configured to determine the internal cross-sectional area of the pipe along its length from the second fluid flow rate and the meniscus position.

Thus the system can be used to perform the method of the first aspect.

The system may have any one or, to the extent that they are compatible, any combination of the following optional features.

The pump may introduce a volume of a third fluid into the filled pipe before feeding the second fluid into the pipe, the third fluid being immiscible with the first and second fluids such that respective menisci are formed at interfaces between the first and third fluids and between the second and third fluids. The flow controller may determine the volume of the third fluid, and the ultrasonic detector may detect the positions of both menisci as they move along the pipe. The processor device can then be configured to determine the internal cross-sectional area of the pipe along its length from the second fluid flow rate and the positions of the menisci.

The processor device may be configured to determine the volume V of the second fluid fed into the pipe from the second fluid flow rate, and to determine the internal cross-sectional area A of the pipe at a given meniscus position x from the expression:

$$A(x)=dV(x)/dx.$$

When the pump introduces a volume of a third fluid into the filled pipe before feeding the second fluid into the pipe, the processor device may be configured to determine the length of the third fluid in the pipe from the positions of the menisci, and to determine the average internal cross-sectional area of the pipe in a region occupied by the third fluid from the volume of the third fluid and its length.

Conveniently, the ultrasonic detector can be configured to direct ultrasound along the fluid in the pipe, the ultrasound reflecting off the meniscus, and then returning along the fluid in the pipe to be detected by the detector.

Embodiments of the invention will now be described by way of example with reference to the accompanying drawings in which.

Figure 1:
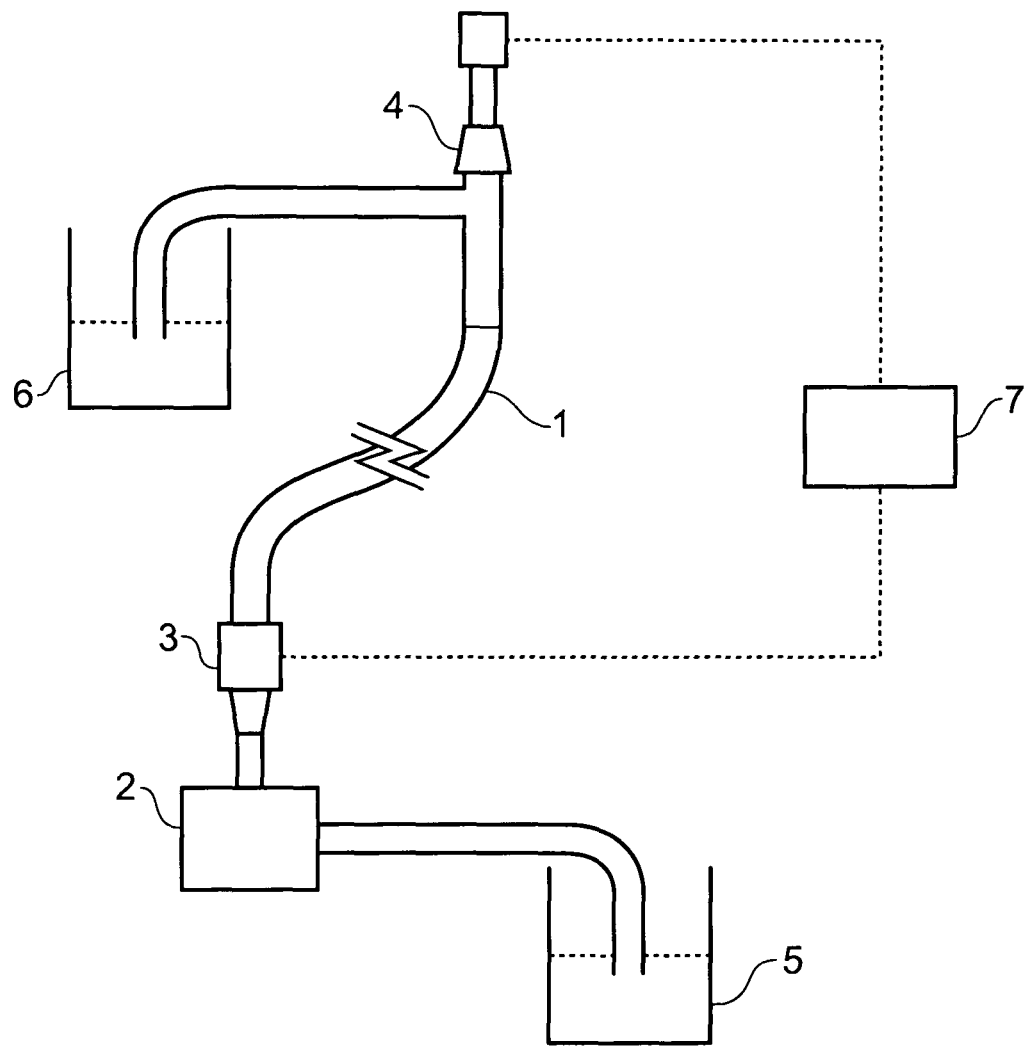
FIG. 1 shows schematically a system for determining the internal cross-sectional area of a pipe along its length.

FIG. 1 shows schematically a system for determining the internal cross-sectional area of a pipe 1 along its length. The pipe, for example a tube of a boiler or steam generator, is subject in use to internal deposit build up and corrosion. The system includes a pump 2 for pumping fluids into the pipe, a mass flow controller 3 for measuring the flow rate of the pumped fluids, and an ultrasonic liquid interface measuring device 4 for measuring ultrasonically the position of a meniscus within the pipe. Conveniently, the pump and the mass flow controller are located at a first end of the pipe and the ultrasonic measuring device at a second end. Fluid to be pumped into the pipe is held in a first reservoir 5 which fluidly communicates with the first end. A second reservoir 6 for receiving fluids which have passed through the pipe fluidly communicates with the second end. A processor device 7, e.g. a suitably programmed computer, accepts flow rate and ultrasound position measurements from respectively the flow controller and the ultrasonic measuring device, and determines from them the internal cross-sectional area of the pipe at positions along the pipe.

Two immiscible fluids are prepared, for example water and benzene, which when deployed in the pipe form a meniscus at their interface. Desirably the fluids have similar densities to prevent buoyancy forces breaking the meniscus. To enhance the integrity of the meniscus, when the pipe has a gradient, the fluids can be deployed in an order such that the lower density fluid is above the higher density fluid. However, it may be possible to select a combination of immiscible fluids such that, for a given pipe diameter, material and internal surface finish, the surface tension forces forming the meniscus are substantially greater than any buoyancy forces. Such a combination would allow the meniscus to remain intact in pipes of any gradient without mixing of the fluids. Typically, the pipe internal diameter is about 10 mm or less.

To use the system, first the pipe 1 is flushed through and filled with the first fluid (e.g. benzene). The pipe is then fed from one end with the second fluid (e.g. water) at a known, constant flow rate. This is accomplished by using the pump 2 to draw the second fluid from the first reservoir 5 into the first end of the pipe and using the mass flow controller 3 to measure the flow rate of the pumped second fluid. The first fluid displaced from the pipe is received in the second reservoir 6.

Figure 2:
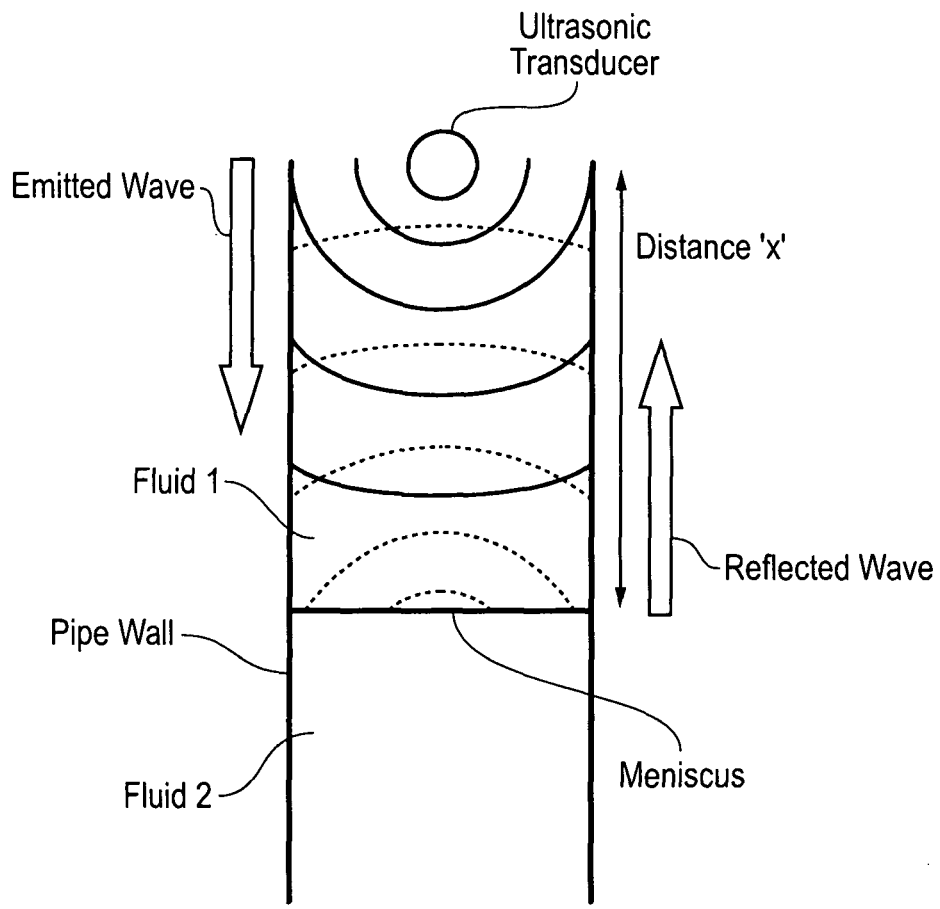
FIG. 2 shows a close up schematic view of the meniscus between the two fluids in the pipe of FIG. 1.

The position of the meniscus is detected using the ultrasonic liquid interface measuring device 4. Suitable devices may be commercially available liquid level detectors of the type described in JP 10332459 A. These operate by transmitting an ultrasound down the fluid in the pipe and timing how long the reflection takes to return, as shown schematically in FIG. 2.

Figure 3A:
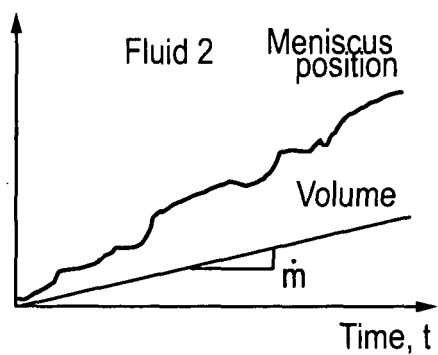
FIG. 3 shows graphs of (a) meniscus position and fluid volume against time, and (b) fluid volume against meniscus position.
Figure 3B:
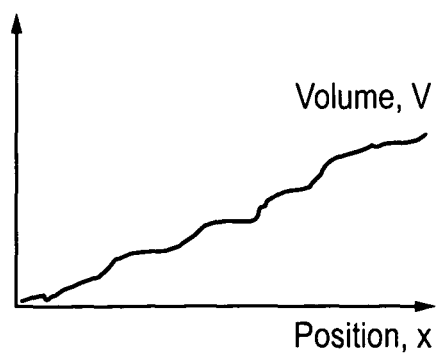

The processor device 7 thus receives a continuous position reading for the meniscus and a measured flow rate for the second fluid, and can determine therefrom a continuous metric for the internal cross-sectional area of the pipe 1 against distance along the pipe. More particularly, the processor device can convert the flow rate into an accumulated volume, as shown in the graph of FIG. 3(a), which contains plots of both the accumulated volume and meniscus position against time. Differentiating the volume with respect to meniscus position then provides the internal cross-sectional area of the pipe 1, as outlined in the equation $$A(x)=dV(x)/dx.$$

where $A(x)$ is internal cross-sectional area at meniscus position x, and $V(x)$ is the volume of the second fluid in the pipe when the meniscus is at position x. The volume plotted against meniscus position is shown in FIG. 3(b).

In a variant of the approach, a known volume of a third fluid is introduced into the pipe 1 (e.g. by the pump 2 and the mass flow controller 3) after the pipe is filled with the first fluid but before the feeding in of the second fluid. The third fluid, which is immiscible with the first and second fluids, thus forms a plug between the first and second fluids with a meniscus at each end of the plug. The ultrasonic measuring device 4 obtains reflections from and measures the positions of both menisci. One option is then simply to obtain two measures for the pipe internal cross-sectional area, one from each meniscus. Alternatively, however, the ultrasonic reflections from the two menisci can be used to measure the length of the third fluid plug, and thus the average cross-sectional area over the length of the plug can be determined from its known volume.

Advantageously, the approach allows the accurate measurement of the internal cross-sectional area of the pipe without access to the outside of the pipe.

Although developed for use in the boiler pipes of nuclear power plants, the approach can be used to other situations where it is necessary to measure the internal cross-sectional area of a pipe and where it is possible to flush fluids through the pipe. For example, the approach may be used to measure cross-sectional areas of fuel lines.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A method of determining an internal cross-sectional area of a pipe along its length, the method including the steps of:
 (a) filling the pipe with a first fluid;
 (b) feeding a second fluid into the pipe at a known flow rate, the second fluid being immiscible with the first fluid, and a meniscus being formed at an interface between the first and the second fluid, the meniscus moving along the pipe as the second fluid displaces the first fluid in the pipe;
 (c) ultrasonically detecting a position of the meniscus as it moves along the pipe; and
 (d) determining from the second fluid flow rate and the meniscus position, the internal cross-sectional area of the pipe along its length, a volume V of the second fluid fed into the pipe being determined from the second fluid flow rate, and the internal cross-sectional area A of the pipe at a given meniscus position x being determined from the expression: $A(x) = dV(x)/dx$.

2. A method according to claim 1 further including between steps (a) and (b) the step of feeding a known volume of a third fluid into the pipe, the third fluid being immiscible with the first fluid and the second fluid such that respective menisci are formed at interfaces between the first fluid and the third fluid and between the second fluid and the third fluid; and wherein, in step (c), the positions of both menisci are detected as they move along the pipe, and, in step (d), the internal cross-sectional area of the pipe along its length is determined from the second fluid flow rate and the positions of the menisci.

3. A method according to claim 2, wherein, in step (d), a length of the third fluid in the pipe is determined from the positions of the menisci, an average internal cross-sectional area of the pipe in a region occupied by the third fluid being determined from the known volume of the third fluid and its length.

4. A method according to claim 1, wherein, in step (c), the position of the meniscus is detected by reflecting ultrasound off the meniscus, the ultrasound travelling to and from the meniscus along the fluid in the pipe.

5. A method according to claim 1, wherein the fluids have similar densities.

6. A system for determining an internal cross-sectional area of a pipe along its length, the system including:
a pump for feeding a second fluid into the pipe, which is previously filled with a first fluid, the second fluid immiscible with the first fluid;
a flow controller for determining the flow rate of the second fluid into the pipe, a meniscus being formed at an interface between the first fluid and the second fluid, the meniscus moving along the pipe as the second fluid displaces the first fluid in the pipe;
an ultrasonic detector for ultrasonically detecting the position of the meniscus as it moves along the pipe; and
is a processor device configured to determine the internal cross-sectional area of the pipe along its length from the second fluid flow rate and the meniscus position, wherein the processor determines a volume V of the second fluid fed into the pipe from the second fluid flow rate, and determines the internal cross-sectional area A of the pipe at a given meniscus position x from the expression: $A(x) = dV(x)/dx$.

7. A system according to claim 6, wherein:
the pump introduces a volume of a third fluid into the filled pipe before feeding the second fluid into the pipe, the third fluid being immiscible with the fluid and the second fluid such that respective menisci are formed at interfaces between the first fluid and the third fluid and between the second fluid and the third fluid;
the flow controller determines the volume of the third fluid;
the ultrasonic detector detects the positions of both menisci as they move along the pipe; and
the processor device is configured to determine the internal cross-sectional area of the pipe along its length from the second fluid flow rate and the positions of the menisci.

8. A system according to claim 7, wherein the processor device is configured to determine a length of the third fluid in the pipe from the positions of the menisci, and to determine an average internal cross-sectional area of the pipe in a region occupied by the third fluid from the volume of the third fluid and its length.

9. A system according to claim 6, wherein the ultrasonic detector is configured to direct ultrasound along the fluid in the pipe, the ultrasound reflecting off the meniscus, and then returning along the fluid in the pipe to be detected by the ultrasonic detector.

* * * * *